(12) United States Patent
Oe et al.

(10) Patent No.: US 11,380,200 B2
(45) Date of Patent: Jul. 5, 2022

(54) SERVER DEVICE

(71) Applicant: TOYOTA JIDOSHA KABUSHIKI KAISHA, Toyota (JP)

(72) Inventors: Yoshihiro Oe, Kawasaki (JP); Kazuya Nishimura, Okazaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 376 days.

(21) Appl. No.: 16/141,365

(22) Filed: Sep. 25, 2018

(65) Prior Publication Data
US 2019/0156671 A1 May 23, 2019

(30) Foreign Application Priority Data
Nov. 20, 2017 (JP) .............................. JP2017-223087

(51) Int. Cl.
| | |
|---|---|
| *G08G 1/127* | (2006.01) |
| *G08G 1/0967* | (2006.01) |
| *G07C 5/00* | (2006.01) |
| *G01C 21/34* | (2006.01) |
| *G08G 1/00* | (2006.01) |
| *G08G 1/16* | (2006.01) |

(Continued)

(52) U.S. Cl.
CPC ............ *G08G 1/127* (2013.01); *B60W 30/17* (2013.01); *G01C 21/32* (2013.01); *G01C 21/3461* (2013.01); *G01C 21/3492* (2013.01); *G07C 5/008* (2013.01); *G08G 1/096791* (2013.01); *G08G 1/164* (2013.01); *G08G 1/166* (2013.01); *G08G 1/20* (2013.01)

(58) Field of Classification Search
CPC .. G08G 1/127; G08G 1/096791; G08G 1/164; G08G 1/166; G08G 1/20; G01C 21/3461; G01C 21/3492; G01C 21/32; G07C 5/008; G07C 5/0808; B60W 30/17
See application file for complete search history.

(56) References Cited

U.S. PATENT DOCUMENTS 6,411,204 B1 * 6/2002 Bloomfield ............ B60Q 1/302
340/464
9,805,601 B1 * 10/2017 Fields .................... G06Q 40/08
(Continued)

FOREIGN PATENT DOCUMENTS

JP 2012-190398 A 10/2012
JP 2015-103047 A 6/2015
(Continued)

*Primary Examiner* — Abby Y Lin
*Assistant Examiner* — Dylan M Katz
(74) *Attorney, Agent, or Firm* — Hunton Andrews Kurth LLP

(57) ABSTRACT

A server device includes a storage unit configured to store vehicle information including vehicle behavior information and position information, a region specifying unit configured to specify a warning road region where a sudden stop of a vehicle occurs a plurality of times based on the stored vehicle information, and a notification unit configured to, when the sudden stop of the vehicle occurs in the specified warning road region, notify terminal devices that correspond to vehicles located in the warning road region and in a vicinity of the warning road region of information regarding the warning road region.

11 Claims, 4 Drawing Sheets

(51) Int. Cl.
*G01C 21/32* (2006.01)
*B60W 30/17* (2020.01)

(56) References Cited

U.S. PATENT DOCUMENTS

| | | | | |
|---|---|---|---|---|
| 2010/0207787 | A1* | 8/2010 | Catten | G08G 1/096716 340/905 |
| 2011/0254676 | A1* | 10/2011 | Marumoto | G07C 5/085 340/441 |
| 2013/0158866 | A1* | 6/2013 | Weir | G01C 21/3617 701/468 |
| 2015/0032289 | A1* | 1/2015 | Lotz | G08G 1/0112 701/1 |
| 2016/0078757 | A1* | 3/2016 | Inaba | G08G 1/0133 701/119 |
| 2017/0210323 | A1* | 7/2017 | Cordova | G08G 1/0141 |
| 2017/0365168 | A1* | 12/2017 | Omiya | G08G 1/0112 |
| 2019/0371180 | A1* | 12/2019 | Hara | G08G 1/164 |

FOREIGN PATENT DOCUMENTS

| | | | |
|---|---|---|---|
| JP | 2015194938 | A | 11/2015 |
| JP | 2016021635 | A | 2/2016 |

* cited by examiner

SERVER DEVICE

INCORPORATION BY REFERENCE

The disclosure of Japanese Patent Application No. 2017-223087 filed on Nov. 20, 2017 including the specification, drawings and abstract is incorporated herein by reference in its entirety.

BACKGROUND

1. Technical Field

The disclosure relates to a server device that collects position information on a vehicle.

2. Description of Related Art

Japanese Unexamined Patent Application Publication No. 2015-103047 (JP 2015-103047 A) discloses a taxi assistance device that collects information about pick-up locations in an area within a predetermined range, which is position information about points where a taxi picked up customers in the past predetermined period, and information about pick-up dates and times, which indicates the year, month, date, and time when the taxi associated with the information about pick-up locations picked up customers, and informs a taxi driver of information about an area where customers were frequently acquired in the past.

SUMMARY

For example, on a crowded road where a pedestrian is likely to come out into a driveway, a vehicle may suddenly stop, and due to the sudden stop of the vehicle, a rear-end collision accident may occur. In order to reduce the incidence of accidents caused by the sudden stop of the vehicle, a technique is desired which collects vehicle information (hereinafter, referred to as 'vehicle information') including vehicle behavior information and position information, specifies a road on which a sudden stop of a vehicle is likely to occur, and informs a driver of the specified road.

The disclosure provides a server device to notify a driver of a road region where a sudden stop of a vehicle is likely to occur.

A first aspect of the disclosure relates to a server device. The server device includes a storage unit, a region specifying unit, and a notification unit. The storage unit is configured to store vehicle information including vehicle behavior information and position information. The region specifying unit is configured to specify a warning road region where a sudden stop of a vehicle occurs a plurality of times based on the stored vehicle information. The notification unit is configured to, when the sudden stop of the vehicle occurs in the specified warning road region, notify terminal devices that correspond to vehicles located in the warning road region and in a vicinity of the warning road region of information regarding the warning road region.

According to the first aspect of the disclosure, the region specifying unit can specify the warning road region where the sudden stop of the vehicle is likely to occur based on a plurality of collected items of the vehicle behavior information and the position information. When a sudden stop of a vehicle occurs in the specified warning road region, the notification unit can notify the terminal devices that correspond to vehicles located in the warning road region and in the vicinity of the warning road region of caution information regarding the warning road region, and a driver who receives the notification can bypass the warning road region where the sudden stop of the vehicle is highly likely to occur or can drive carefully in the warning road region.

The server device according to the first aspect may further include an acquisition unit configured to acquire the vehicle information transmitted from the terminal device provided in the vehicle.

In the server device according to the first aspect, the storage unit may be configured to store vehicle information on a taxi, and the region specifying unit may be configured to specify the warning road region based on the vehicle information on the taxi. With analysis of the behavior of the taxi that is likely to suddenly stop, rather than the analysis of the behavior of all vehicles, it is possible to effectively collect information about the suddenly stop of the vehicle.

In the server device according to the first aspect, the vehicle information may include information indicating a vehicle speed, a vehicle acceleration, and an engine speed, position information acquired using a global positioning system, and a time.

The server device according to the first aspect may further include a behavior detecting unit configured to, based on the vehicle information, detect that the sudden stop of the vehicle occurs when the rearward acceleration of the vehicle is equal to or greater than a predetermined value within a predetermined time and a vehicle speed becomes zero.

In the server device according to the first aspect, the region specifying unit may be configured to specify a region where the sudden stop of the vehicle occurs more than a predetermined number of times as the warning road region.

In the server device according to the first aspect, the region specifying unit may be configured to set a gradual warning level in the warning road region according to the number of occurrences of the sudden stop of the vehicle.

A second aspect of the disclosure relates to a server device. The server device includes a processor and a storage unit. The processor is configured to acquire vehicle information including vehicle behavior information and position information transmitted from a terminal device provided in a vehicle and store the acquired vehicle information in the storage unit, specify a warning road region where a sudden stop of a vehicle occurs a plurality of times based on the vehicle information stored in the storage unit, and when the sudden stop of the vehicle occurs in the specified warning road region, notify terminal devices that correspond to vehicles located in the warning road region and in a vicinity of the warning road region of information regarding the warning road region.

In the server device according to the second aspect, the processor may be configured to store vehicle information transmitted from a terminal device of a taxi in the storage unit and specify the warning road region based on the vehicle information on the taxi.

According to the aspects of the disclosure described above, it is possible to provide a technology for notifying a driver of a road region where a sudden stop of a vehicle is likely to occur.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
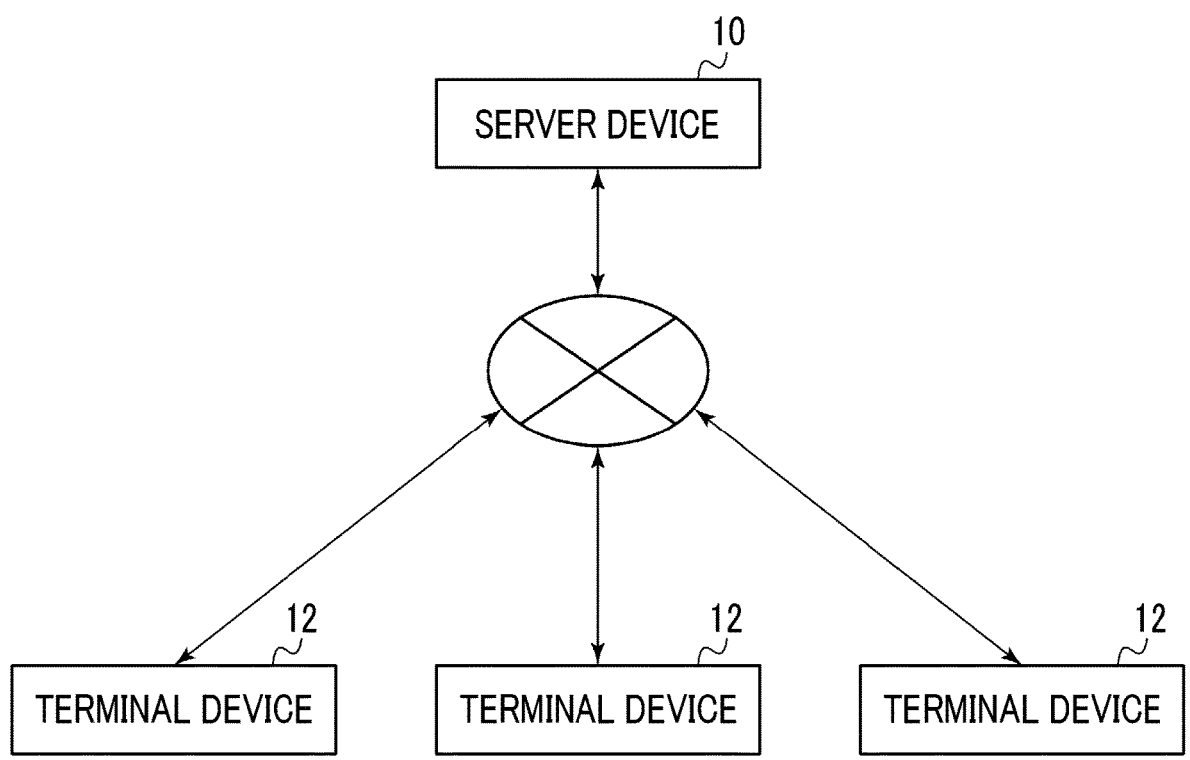
FIG. 1 is a schematic view of a warning region specifying system.

FIG. 1 is a schematic view of a warning region specifying system 1. The warning region specifying system 1 is configured to include a server device 10 and terminal devices 12. The server device 10 and the terminal devices 12 are connected to each other through a network.

The terminal device 12 is provided in a vehicle and periodically transmits vehicle information indicating a behavior and a location of the vehicle to the server device 10. The vehicle information is information about the vehicle behavior, which includes information indicating a vehicle speed, a vehicle acceleration and an engine speed, and position information acquired using a global positioning system (GPS) and a time. The information indicating the vehicle acceleration may include an acceleration in the forward and rearward directions of the vehicle, a lateral acceleration, a yaw rate, or the like.

The server device 10 collects a plurality of items of vehicle information transmitted from the terminal devices 12, detects a sudden stop of a vehicle from the vehicle information transmitted from the terminal devices 12, and specifies the warning road region on which a sudden stop of the vehicle is highly likely to occur. The server device 10 notifies a vehicle in the vicinity of the warning road region of warning information when a sudden stop of a vehicle occurs in the warning road region.

The terminal device 12 is provided, particularly in a taxi to transmit vehicle information on the taxi to the server device 10. Taxis often perform a sudden stop when passengers get in and out, and in the worst case, a rear-end collision accident may occur by a taxi that suddenly stops. The server device 10 can specify a road region where a sudden stop of a vehicle is likely to occur by collecting vehicle behavior information and position information on the taxi, and notify vehicles located in the vicinity of the warning road region of information regarding the specified warning road region, which makes it possible to bypass the warning road region or drive carefully in the warning road region.

Figure 2:
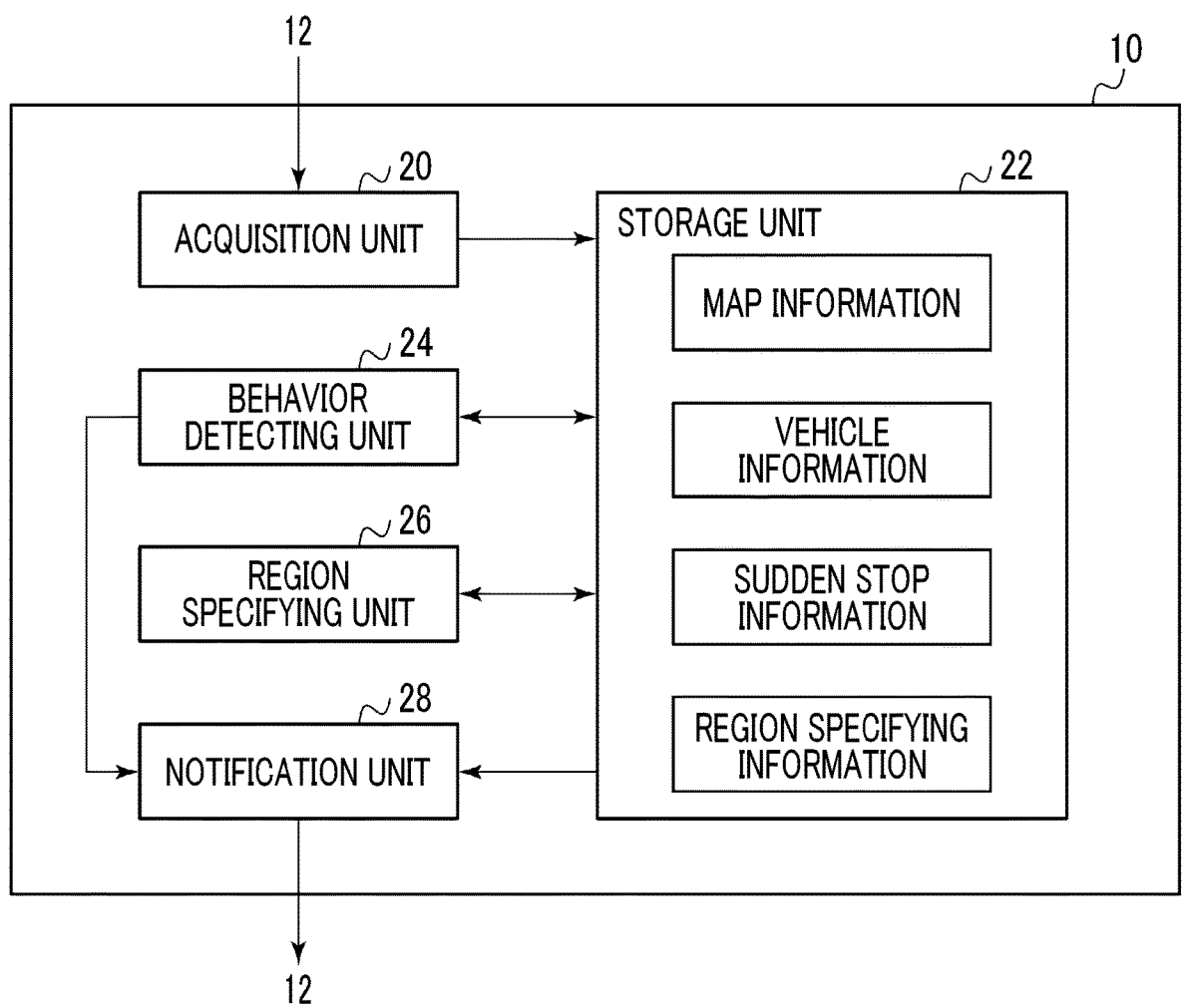
FIG. 2 is a view of a functional configuration of a server device.

FIG. 2 is a view of describing a functional configuration of the server device 10. The server device 10 includes an acquisition unit 20, a storage unit 22, a behavior detecting unit 24, a region specifying unit 26 and a notification unit 28. The acquisition unit 20 acquires vehicle information from a plurality of terminal devices 12.

The storage unit 22 stores map information, vehicle information transmitted from the terminal device 12, sudden stop information detected by the behavior detecting unit 24, and region specifying information specified by the region specifying unit 26. The vehicle information includes a vehicle ID, vehicle behavior information indicating behavior of a vehicle, and position information on the vehicle.

The behavior detecting unit 24 detects a sudden stop of the vehicle based on the vehicle behavior information and stores the time and location at which the sudden stop of the vehicle occurs in the storage unit 22. The behavior detecting unit 24 detects the sudden stop of the vehicle based on at least the rearward acceleration of the vehicle and the vehicle speed. For example, when the acceleration in the rearward direction of the vehicle is equal to or greater than a predetermined value within a predetermined time and the vehicle speed is zero, the behavior detecting unit 24 detects that the sudden stop of the vehicle occurs. When the sudden stop of the vehicle is detected by the behavior detecting unit 24, the time and location of the vehicle at which the vehicle speed becomes zero are made to be stored as the sudden stop information in the storage unit 22. As described above, the time and location at which the vehicle suddenly stops are accumulated. The behavior detecting unit 24 uses the vehicle information on the taxi which frequently stops suddenly, which makes it possible to effectively collect the sudden stop information on the vehicle, rather than detecting sudden stops of all vehicles.

The region specifying unit 26 specifies the warning road region (hereinafter, referred to as 'warning road region') where the sudden stop of the vehicle occurs a plurality of times based on the stored vehicle information. The warning road region may be set for a road of a predetermined range, for example, a road within a range of 100 meters, and may be set for a road surrounding an event venue such as a fairground or a ball gallery. The region specifying unit 26 may specify, as the warning road region, the region in which the number of times of the sudden stop of the vehicle per predetermined time is greater than the average value by a predetermined number of times. Since the region, in which the number of times of the sudden stop of the vehicle per predetermined time is greater than the average value, is set to be the warning road region, it is possible to specify the road region where the sudden stop of the vehicle is highly likely to occur.

For example, the region specifying unit 26 may specify the region where the sudden stop of the vehicle occurs one hundred times or more in a week as the warning road region, and may specify the region where the sudden stop of the vehicle occurs five times or more in an hour as the warning road region. In a case of monitoring the number of occurrences of the sudden stop of the vehicle in a long time, a location where the sudden stop of the vehicle is likely to occur chronically can be specified. Meanwhile, in a case of monitoring the number of occurrences of the sudden stop of the vehicle in a short time, a location where the sudden stop of the vehicle is likely to occur due to a temporary event can be specified.

The region specifying unit 26 stores the region specifying information regarding the specified warning road region in the storage unit 22. The region specifying information includes information indicating the location of the warning road region and information indicating a time slot in which the sudden stop of the vehicle occurs. Inclusion of the time slot in which the sudden stop of the vehicle occur in the information regarding the warning road region makes it possible to specify the road region with a temporary high degree of danger caused by congestion that occurs, for example, during the time students travel to or from school and during rush hour.

The region specifying unit 26 may set a gradual warning level in the warning road region according to the number of occurrences of the sudden stop of the vehicle per predetermined time, and cause information indicating that the sudden stop is likely to occur to be included in the region specifying information and then to be stored in the storage unit 22. The region specifying unit 26 may cause a warning score, which is calculated based on the location and the time at which the sudden stop of the vehicle occurs, to be included in the region specifying information, as information indicating that the sudden stop is likely to occur, and then to be stored in the storage unit 22. The information indicating that the sudden stop is likely to occur, such as the warning level, the warning score, and the like, is used for a process in which the notification unit 28 decides to give a notification, and the warning road region with a high warning level or warning score is notified more easily.

When the sudden stop of the vehicle occurs in the specified warning road region, the notification unit 28 notifies terminal devices 12 that correspond to vehicles located in the warning road region and in the vicinity of the warning road region of information regarding the warning road region. In other words, when the sudden stop of the vehicle occurs again at a location specified as the warning road region by a plurality of sudden stops of vehicles occurred in the past, the notification unit 28 notifies vehicles in the vicinity of the warning road region to be on the alert for the road. As described above, a driver who receives the notification can bypass the warning road region where the sudden stop of the vehicle is highly likely to occur, or drive carefully in the warning road region.

When the sudden stop of the vehicle occurs in the warning road region, the notification unit 28 immediately notifies terminal devices 12 that correspond to vehicles located within 5 kilometers from the warning road region of caution information regarding the warning road region. If the terminal device 12 receives the caution information regarding the warning road region, for example, the terminal device 12 may display the caution information on a display installed on a navigation device in a pop-up window, or may display a symbol indicating caution at a position on a map corresponding to the warning road region when navigation is performed. The terminal device 12 that receives the notification from the notification unit 28 may be a portable terminal of the driver.

The notification unit 28 determines whether or not the location and the time at which the sudden stop of the vehicle occurs are among warning road regions and time slots of the region specifying information stored in the storage unit 22, and if the determination is positive, decides to give a notification of caution information and if the determination is negative, does not give any notification.

The notification unit 28 may decide to execute a notification when the sudden stop of the vehicle occurs a plurality of times in the warning road region and the time slot of the region specifying information. The notification unit 28 may change a notification executing condition based on information indicating that the stored sudden stop is likely to occur, and when the likelihood of the sudden stop is lower than a predetermined value, may be set so as not to easily execute the notification compared to a case where the likelihood of the sudden stop is higher than the predetermined value. For example, in a case where the likelihood of the sudden stop in the warning road region is higher than the predetermined value, which indicates that the sudden stop of the vehicle is more likely to occur, the notification unit 28 decides to execute the notification when the sudden stop of the vehicle occurs once in the warning road region and the time slot of the region specifying information. In a case where the likelihood of the sudden stop of the warning road region is lower than the predetermined value, the notification unit 28 decides to execute the notification when the sudden stop of the vehicle occurs a plurality of times in the warning road region and the time slot of the region specifying information. As described above, it is possible to accurately give a notification depending on the likelihood of the sudden stop of the vehicle.

The notification unit 28 may give a notification using schedule information, such as an event venue or the like, when the sudden stop of the vehicle occurs in the warning road region. The event venue is a place, such as a stadium, a concert hall, and a fairground, where an event that may cause road congestion is in progress. In a case when the sudden stop of the vehicle occurs in the warning road region, if the notification unit 28 acquires, from the schedule information, the information that an event is in progress around the location where the sudden stop of the vehicle occurs, the notification unit 28 gives a notification, which includes information indicating the event is in progress in the caution information regarding the warning road region.

The region specifying unit 26 adjusts a warning level or a warning score of the warning road region to be high when a vehicle of a terminal device 12 that has received the notification given by the notification unit 28 bypasses the warning road region. As described above, an action history of the vehicle of the terminal device 12 that has received, from the notification unit 28, the caution information about the warning road region can be fed back. The behavior detecting unit 24 determines whether or not the vehicle that has received the caution information about the warning road region bypasses the warning road region, based on the vehicle information stored in the storage unit 22.

Figure 3:
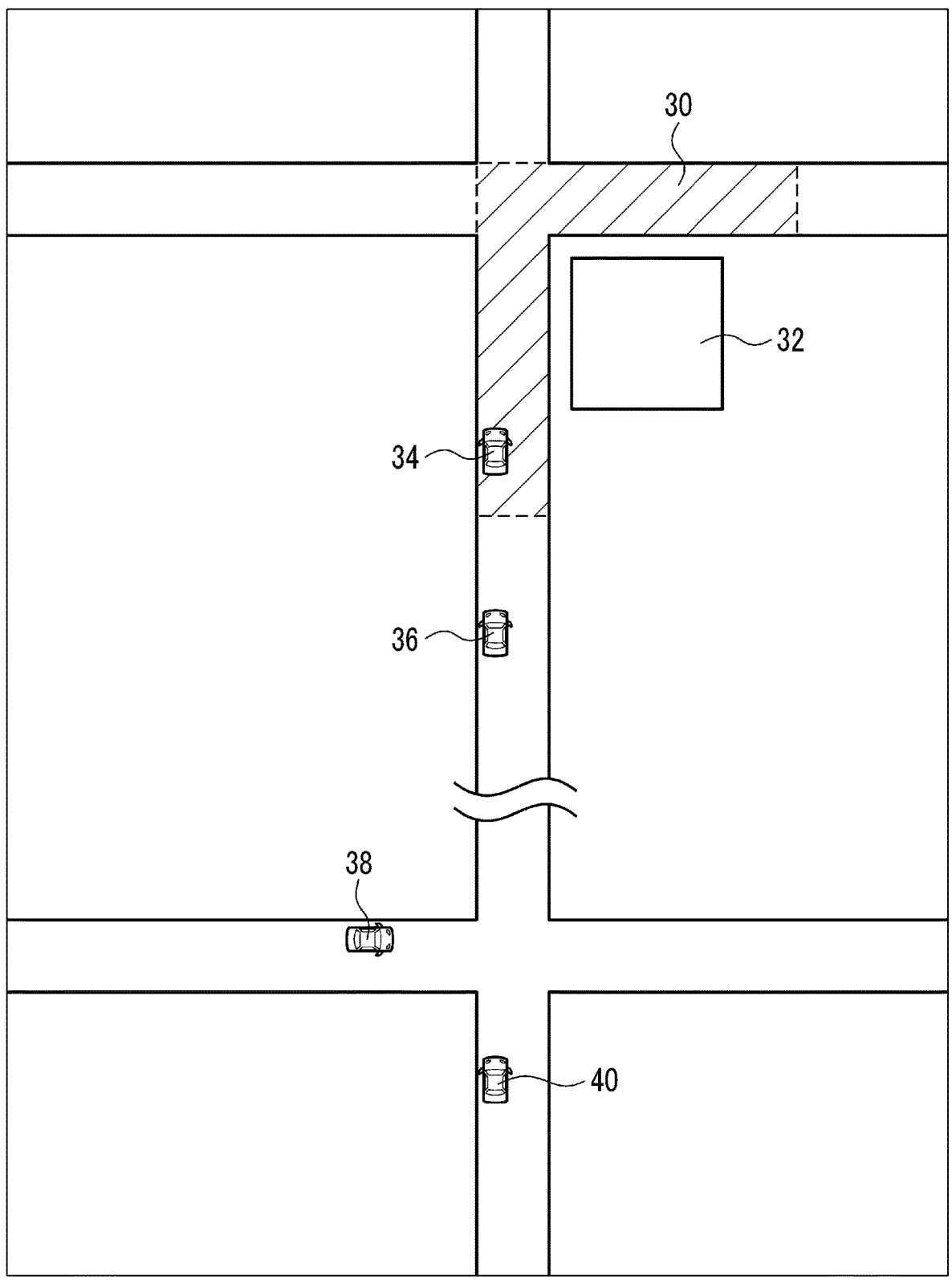
FIG. 3 is a view of a process of the server device at a time when a taxi suddenly stops in a warning road region.

FIG. 3 is a view of describing a process of the server device 10 at a time when a taxi 34 suddenly stops in the warning road region 30. In a map shown in FIG. 3, the warning road region 30 is set on a road around an event venue 32.

The taxi 34 is traveling in a warning road region 30, and is transmitting vehicle information indicating a vehicle behavior and a location from the terminal device 12 of the taxi 34 to the server device 10. A first vehicle 36, a second vehicle 38 and a third vehicle 40 are transmitting vehicle information from their own terminal devices 12 to the server device 10.

The taxi 34 shown in FIG. 3 stops suddenly in the warning road region 30 and then the vehicle information is transmitted from the terminal device 12 to the server device 10. The behavior detecting unit 24 of the server device 10 detects the sudden stop from the vehicle information on the taxi 34, and stores the sudden stop information in the storage unit 22. The notification unit 28 receives the sudden stop information from the behavior detecting unit 24, and determines that the sudden stop location of the taxi 34 is included in warning road regions of the region specifying information stored in the storage unit 22. The notification unit 28 notifies the terminal device 12 of each of the first vehicle 36, the second vehicle 38 and the third vehicle 40 of the caution information regarding the warning road region 30.

A driver of the first vehicle 36, who receives the caution information regarding the warning road region 30, can drive carefully, and drivers of the second vehicle 38 and the third vehicle 40 can avoid the warning road region 30. As described above, assistance with driving can be performed. Nearby vehicles are notified of the information regarding the warning road region where the sudden stop of the vehicle occurs, which makes it possible to bypass the warning road region or drive carefully.

Figure 4:
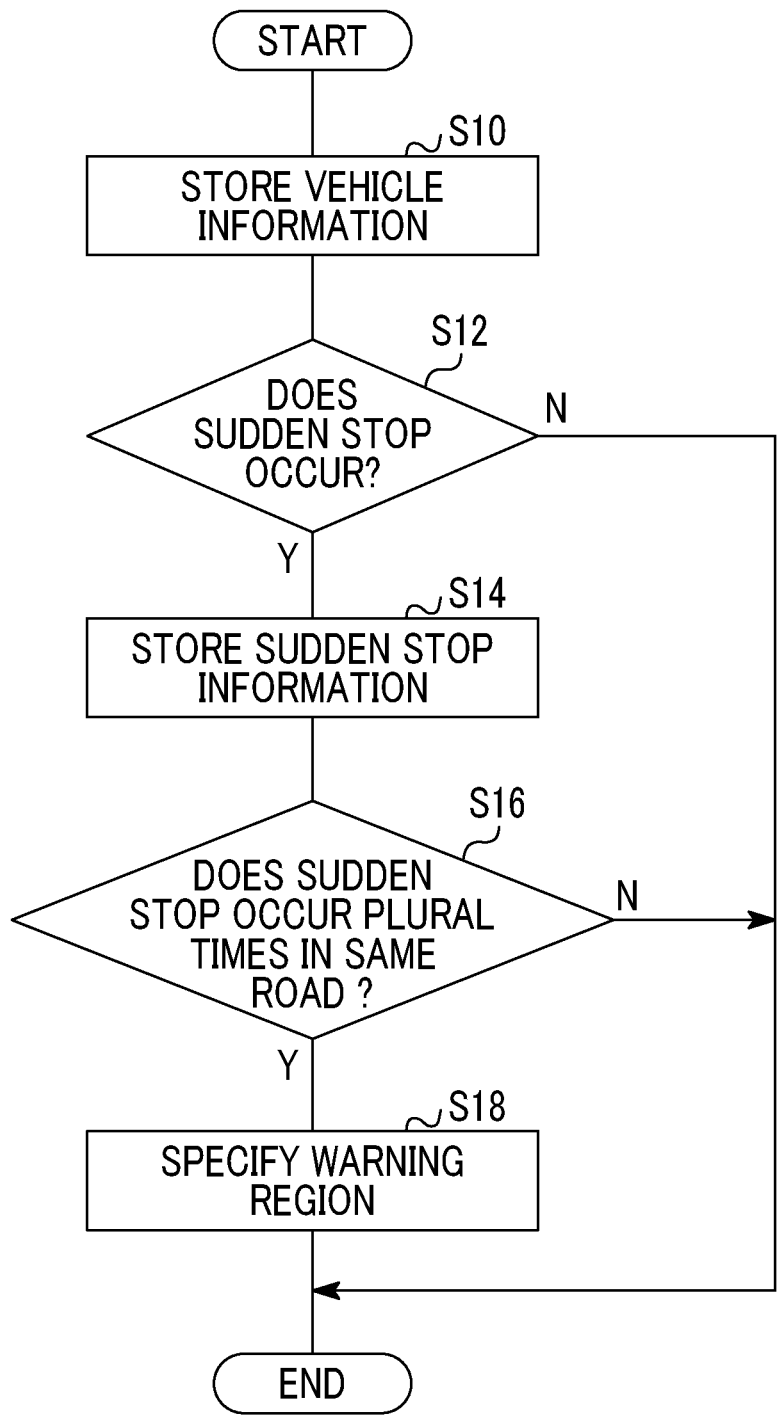
FIG. 4 is a flowchart of a process for specifying the warning road region.

FIG. 4 is a flowchart of a process for specifying the warning road region 30. The storage unit 22 stores vehicle information transmitted from the vehicle terminal devices 12 (S10). The behavior detecting unit 24 determines whether or not the sudden stop of the vehicle occurs based on the stored vehicle information (S12). If the sudden stop of the vehicle does not occur (N in S12), the process ends without the region specifying unit 26 specifying the warning road region 30.

If the sudden stop of the vehicle occurs (Y in S12), the behavior detecting unit 24 stores the sudden stop information indicating the sudden stop location of the vehicle in the storage unit 22 (S14). The region specifying unit 26 determines whether or not the sudden stop of the vehicle occurs a plurality of times in the same road region (S16). If the sudden stop of the vehicle occurs a plurality of times per predetermined time in the same road region (Y in S16), the region specifying unit 26 specifies the road region as the warning road region 30 (S18), and stores the region specifying information in the storage unit 22. If the sudden stop of the vehicle does not occur a plurality of times per predetermined time in the same road region (N in S16), the process ends without the region specifying unit 26 specifying the warning road region 30. As described above, it is possible to specify, from the items of vehicle behavior information, the road where the sudden stop of the vehicle is likely to occur.

In the embodiment, the acquisition unit 20, the behavior detecting unit 24, the region specifying unit 26 and the notification unit 28 of the server device 10 may be implemented by a processor.

It is to be understood by those skilled in the art that the embodiment is merely exemplary, and that various modifications can be made by combinations of respective components and the modifications fall within the scope of the disclosure.

What is claimed is:

1. A server device comprising a processor and a storage unit, the processor being configured to:
    store in the storage unit vehicle information including vehicle behavior information and position information, the vehicle behavior information comprising a vehicle speed, a vehicle acceleration and an engine speed;
    specify a warning road region where a sudden stop of a vehicle occurs a plurality of times based on the stored vehicle information;
    when the sudden stop of the vehicle occurs in the specified warning road region, notify terminal devices that correspond to vehicles located in the warning road region and in a vicinity of the warning road region of information regarding the warning road region;
    acquire information that an event is in progress around the location where the sudden stop of the vehicle occurs from schedule information when the sudden stop of the vehicle occurs in the warning road region; and notify the information regarding the warning road region that includes information indicating the event is in progress; and
    adjust a warning level of the warning road region to be a high level when a vehicle that has received the information regarding the warning road region bypassed the warning road region.

2. The server device according to claim 1, wherein the processor is further configured to acquire the vehicle information transmitted from the terminal device provided in the vehicle.

3. The server device according to claim 1, wherein the processor is further configured to:
    store in the storage unit vehicle information on a taxi; and
    specify the warning road region based on the vehicle information on the taxi.

4. The server device according to claim 1, wherein the position information is acquired using a global positioning system, and a time.

5. The server device according to claim 1, wherein the processor is further configured to, based on the vehicle information, detect that the sudden stop of the vehicle occurs when a rearward acceleration of the vehicle is equal to or greater than a predetermined value within a predetermined time and a vehicle speed becomes zero.

6. The server device according to claim 1, wherein the processor is further configured to specify a region where the sudden stop of the vehicle occurs more than a predetermined number of times as the warning road region.

7. The server device according to claim 6, wherein the processor is further configured to set a gradual warning level in the warning road region according to the number of occurrences of the sudden stop of the vehicle.

8. The server device according to claim 1, wherein when the likelihood of the sudden stop is lower than a predetermined value, the processor is set to be less likely to execute the notification compared to a case where the likelihood of the sudden stop is higher than the predetermined value.

9. A server device comprising:
    a processor; and
    a storage unit,
    wherein the processor is configured to:
        acquire vehicle information including vehicle behavior information and position information transmitted from a terminal device provided in a vehicle and store the acquired vehicle information in the storage unit, the vehicle behavior information comprising a vehicle speed, a vehicle acceleration and an engine speed,
        specify a warning road region where a sudden stop of a vehicle occurs a plurality of times based on the vehicle information stored in the storage unit,
        when the sudden stop of the vehicle occurs in the specified warning road region, notify terminal devices that correspond to vehicles located in the warning road region and in a vicinity of the warning road region of information regarding the warning road region,
        acquire information that an event is in progress around the location where the sudden stop of the vehicle occurs from schedule information when the sudden stop of the vehicle occurs in the warning road region; and notify the information regarding the warning road region that includes information indicating the event is in progress, and
        adjust a warning level of the warning road region to be a high level when a vehicle that has received the information regarding the warning road region bypassed the warning road region.

10. The server device according to claim 9, wherein the processor is configured to store vehicle information transmitted from a terminal device of a taxi in the storage unit and specify the warning road region based on the vehicle information on the taxi.

11. The server device according to claim 9, wherein when the likelihood of the sudden stop is lower than a predetermined value, the processor is set to be less likely to execute the notification compared to a case where the likelihood of the sudden stop is higher than the predetermined value.

* * * * *